(12) United States Patent
Roth et al.

(10) Patent No.: US 9,881,516 B1
(45) Date of Patent: Jan. 30, 2018

(54) SYSTEM AND METHOD FOR DETECTING CHEATING WHILE ADMINISTERING ONLINE ASSESSMENTS

(71) Applicant: HONORLOCK, LLC, Boca Raton, FL (US)

(72) Inventors: Adam Roth, Boca Raton, FL (US); Robert W Nelson, Pompano Beach, FL (US); Charles Wheelus, Lake Worth, FL (US)

(73) Assignee: HONORLOCK, LLC, Boca Raton, FL (US)

( * ) Notice: Subject to any disclaimer, the term of this patent is extended or adjusted under 35 U.S.C. 154(b) by 277 days.

(21) Appl. No.: 14/800,043

(22) Filed: Jul. 15, 2015

(51) Int. Cl.
*G09B 19/00* (2006.01)
*G09B 5/00* (2006.01)
*H04L 29/08* (2006.01)
*G06F 21/00* (2013.01)

(52) U.S. Cl.
CPC .............. *G09B 19/00* (2013.01); *G09B 5/00* (2013.01); *H04L 67/02* (2013.01); *H04L 67/22* (2013.01); *G06F 21/00* (2013.01)

(58) Field of Classification Search
USPC ........................................................ 434/322
See application file for complete search history.

(56) References Cited

U.S. PATENT DOCUMENTS

| | | | | |
|---|---|---|---|---|
| 7,996,530 B1 * | 8/2011 | Hogeboom | ........... | H04L 63/123 709/219 |
| 8,116,674 B2 * | 2/2012 | Matthews | ................ | G09B 5/00 434/219 |
| 8,826,400 B2 * | 9/2014 | Amaya Calvo | ..... | H04L 63/1441 713/168 |
| 9,003,012 B2 * | 4/2015 | Balasubramanian | ........................... | H04L 12/2602 709/224 |
| 2002/0197595 A1 * | 12/2002 | Hoyashita | ................ | G09B 7/00 434/350 |
| 2004/0220935 A1 * | 11/2004 | McGraw | ................ | G09B 19/00 |

(Continued)

OTHER PUBLICATIONS

Xingming, "Verifiable Text Watermarking Detection to Improve Security", Sep. 2014, International Journal of Security and its Applications, https://www.researchgate.net/publication/282829702_Verifiable_Text_Watermarking_Detection_to_Improve_Security.*

(Continued)

*Primary Examiner* — Andrew Iwamaye
*Assistant Examiner* — William Ermlick
(74) *Attorney, Agent, or Firm* — Steven M. Greenberg, Esq.; CRGO Law

(57) ABSTRACT

A server, method and computer program product for identifying online usage of honeypots by test-takers during administration of online assessments is disclosed. The server includes at least one computer processor coupled to a network interface and configured to receive a pool of test questions used for a learning assessment. The server converts each question in the pool into a watermarked question comprising a unique string of characters; creates a corresponding web beacon for each watermarked question in the pool; loads available PHP server header information; propagates each watermarked question onto at least one seed site domain to create a cluster of seed sites; and detects when a test-taker visits at least one of the seed sites during an online assessment.

22 Claims, 10 Drawing Sheets

(56) References Cited

U.S. PATENT DOCUMENTS

| | | | | |
|---|---|---|---|---|
| 2006/0239503 A1* | 10/2006 | Petrovic | ............ | H04L 9/002 |
| | | | | 382/100 |
| 2006/0290999 A1* | 12/2006 | Ebitani | ............ | G09B 7/02 |
| | | | | 358/426.06 |
| 2007/0048723 A1* | 3/2007 | Brewer | ............ | G09B 7/02 |
| | | | | 434/350 |
| 2007/0299964 A1* | 12/2007 | Wong | ............ | G06Q 30/02 |
| | | | | 709/224 |
| 2009/0165108 A1* | 6/2009 | Chen | ............ | G06F 21/445 |
| | | | | 726/7 |
| 2009/0288174 A1* | 11/2009 | Wilson | ............ | G06F 21/16 |
| | | | | 726/30 |
| 2014/0032638 A1* | 1/2014 | Park | ............ | H04L 67/42 |
| | | | | 709/203 |
| 2014/0330709 A1* | 11/2014 | Lonstein | ............ | G06Q 30/06 |
| | | | | 705/40 |
| 2016/0019803 A1* | 1/2016 | Ipeirotis | ............ | G09B 7/00 |
| | | | | 434/353 |
| 2016/0070908 A1* | 3/2016 | Sanghvi | ............ | G06F 21/554 |
| | | | | 726/23 |

OTHER PUBLICATIONS

Egwali et al., "A Multipurpose Authentication MOdel for Distance Learning Online Assessment", 2012, Progressio pp. 100-112, https://www.researchgate.net/profile/Cheryl_Roux/publication/307761265_Teaching_Oral_History_Research_in_an_Open_Distance_Learning_ODL_Context/links/5812069908ae1625bc611e53.pdf?origin=publication_list.*

* cited by examiner

FIG. 8

SYSTEM AND METHOD FOR DETECTING CHEATING WHILE ADMINISTERING ONLINE ASSESSMENTS

BACKGROUND

The remote administration of assessments (tests) over a communications network is commonplace. While such online testing facilitates ease and convenience for test-takers and administrators, remotely administered tests over such a communications network provide ample opportunities for cheating. It is very common for test-takers to collude with others testers over the network and/or to conduct online searching for answers to test questions as they are presented.

It would therefore be advantageous to enable test administration clients to detect cheating attempts when a test-taker engages in online searching for answers to questions during the exam, and to provide evidence of such cheating in a supportable manner.

SUMMARY

In accordance with an aspect of the disclosure, a server is disclosed for identifying online usage of honeypots by test-takers during administration of online assessments. The server comprises at least one computer processor and program instructions stored in memory, which when executed by the computer processor, causes the computer processor to: receive a pool of test questions used for learning assessment and convert each question in the pool into a watermarked question comprising a unique string of characters. A corresponding web beacon is created for each watermarked question in the pool, and available PHP server header information is loaded to enable each watermarked question to be propagated onto at least one seed site domain to create a cluster of seed sites. When a test-taker attempts to cheat by visiting at least one of the seed sites during an online assessment, the attempt can be identified and later presented as evidence of cheating during the examination.

In accordance with another aspect, there is provided a method for identifying online usage of honeypots by test-takers during administration of online assessments. The method generally comprises the steps of, via at least one computer processor coupled to a network interface: receiving a pool of test questions used for learning assessment; converting each question in the pool into a watermarked question comprising a unique string of characters; creating a corresponding web beacon for each watermarked question in the pool; loading available PHP server header information; propagating each watermarked question onto at least one seed site domain to create a cluster of seed sites; and detecting when a test-taker visits at least one of the seed sites during an online assessment.

In accordance with yet another aspect of the disclosure, there is provided a non-transitory computer readable medium comprising program instructions stored thereon, which when executed by at least one computer processor, cause a server to perform the method steps described above.

In accordance with these and additional aspects that will become apparent hereinafter, the present disclosure will now be described with particular reference to the accompanying drawings.

BRIEF DESCRIPTION OF THE DRAWINGS

The present disclosure is illustrated by way of example and not limited in the accompanying figures in which like reference numerals indicate similar elements and in which:

FIG. 8 is a screen shot of a plurality of illustrative honeypot sites returned after a search using the watermarked questions;

DETAILED DESCRIPTION

Figure 1:
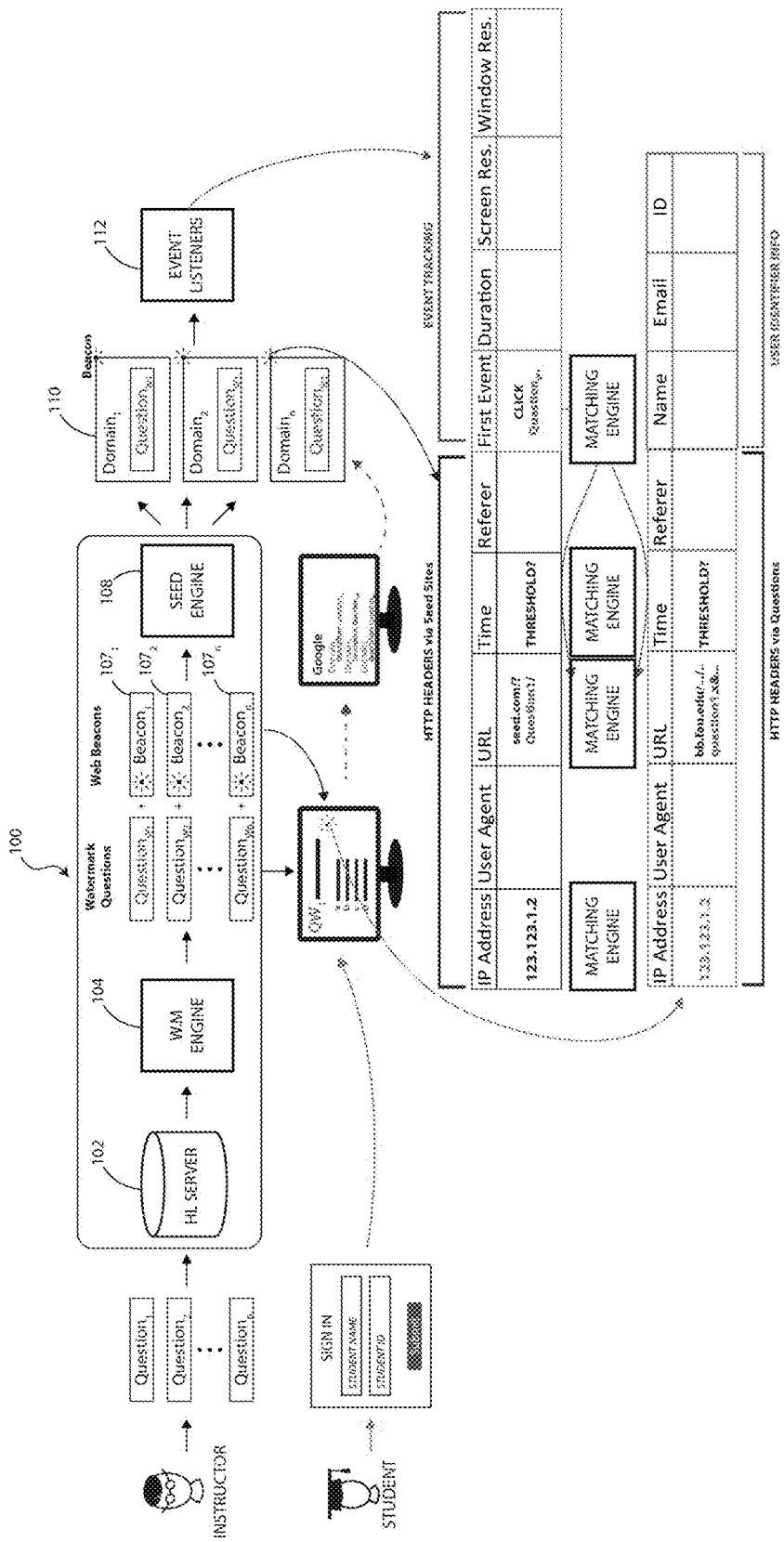
FIG. 1 is a schematic diagram illustrating an overview of an exemplary system architecture and environment for carrying out aspects of the disclosure.

Specific embodiments of the disclosure will now be described in detail with reference to the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more through understanding of the disclosure. However, it will be apparent to those skilled in the art that the disclosure may be practiced without these specific details. In other instances, well-known features have not been described in detail to avoid unnecessarily complicating the description.

Referring to FIG. 1, there is depicted an overview of an exemplary system architecture 100 for detecting usage of honeypots while simultaneously administering online assessments and for identifying assessment takers (test-takers) who access such honeypots by matching their identifier information (i.e., credentials) with their session information. The system 100 generally comprises at least one server 102 configured to implement a watermark engine 104 that creates unique strings for each question in a pool of assessment questions $106_1$, $106_2$ ... $106_n$. Watermarking engine 104 replaces standard characters in the questions with visually similar entities using Unicode character sets of UTF-8 encoding. These are referred to herein as watermarked questions $106_{w1}$, $106_{w2}$ ... $106_{wn}$. The watermark becomes embedded in the question content, and the visual appearance of the original question is maintained and hence the watermarked question is indiscernible from the original. The unique strings are then given preference in search engines that are indexed/crawled. The watermarked questions are submitted to a learning management system as a replacement for the original questions used in an assessment. For each question in the pool, a corresponding web beacon $107_1$, $107_2$ ... $107_n$ is created. The web beacon can also be characterized as a "web-bug" or "transparent pixel") and identifies user information and facilitates detection of page load time for a particular question accessed by the test-taker. The watermarked questions are fed to a seed engine 108 that propagates watermarked questions 108 onto a plurality of seed site domains 110 (honeypots) corresponding to the questions. This creates a cluster of seed sites that are monitored during an exam. Each seed site domain contains a listener engine 112 that tracks listener events (to determine visit duration, mouse hover x/y coordinates, mouse click events and x/y coordinates, screen resolution, window resolution) in addition to any available PHP server header information when the seed site domain is loaded.

Figure 2:
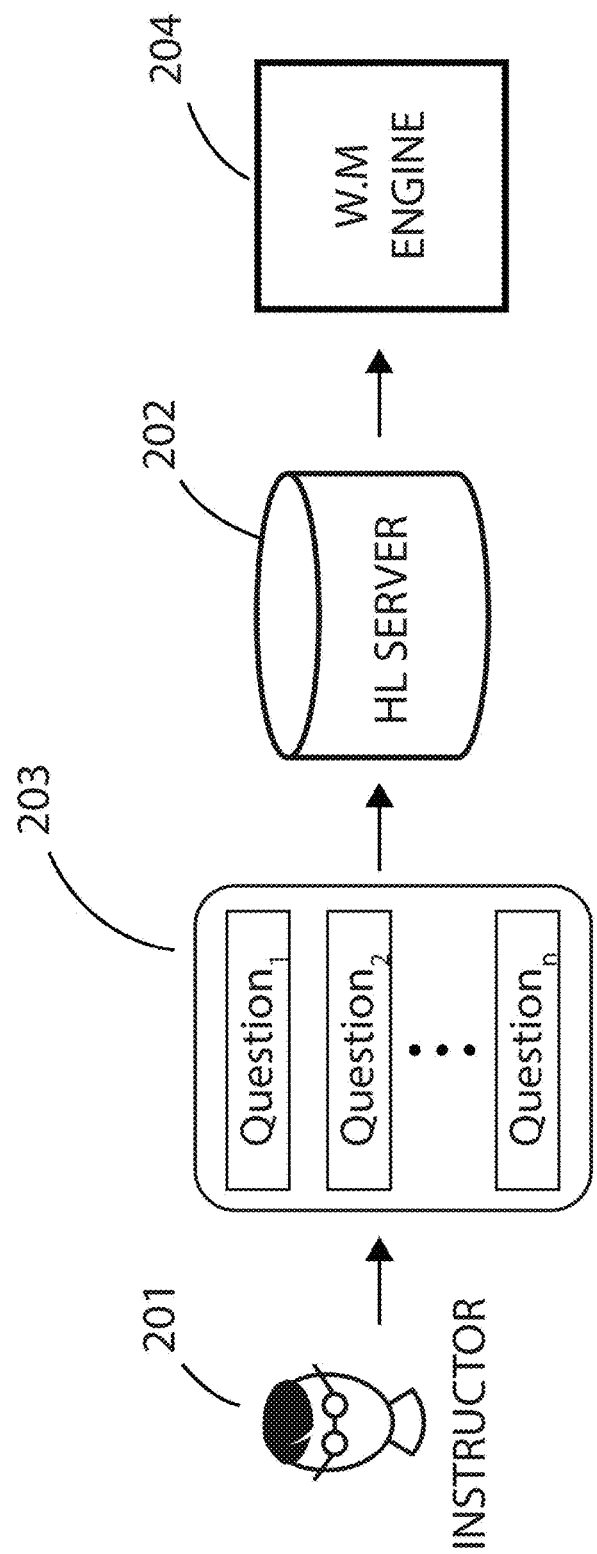
FIG. 2 is a high-level schematic diagram of an aspect of the disclosure directed to watermarking test questions.

Referring to FIG. 2 is a high-level schematic diagram 200 of an aspect of the disclosure. A client/user/instructor 201 uploads a pool of questions 203 to be used for distance learning assessment on to the system server 202. The system server 203 processes the questions 203 via the watermarking engine 204. The unique strings are then given preference in search engines that are indexed/crawled. The watermarking engine 204 is operable to replace standard characters with visually-similar entities using Unicode character sets or UTF-8 encoding. This becomes embedded within the question content. The watermarking engine 404 transforms the original question(s) into a unique string(s) that previously never existed on any indexed location, be it on the Web or otherwise, while maintaining the visual appearance of the original question(s).

Figure 3:
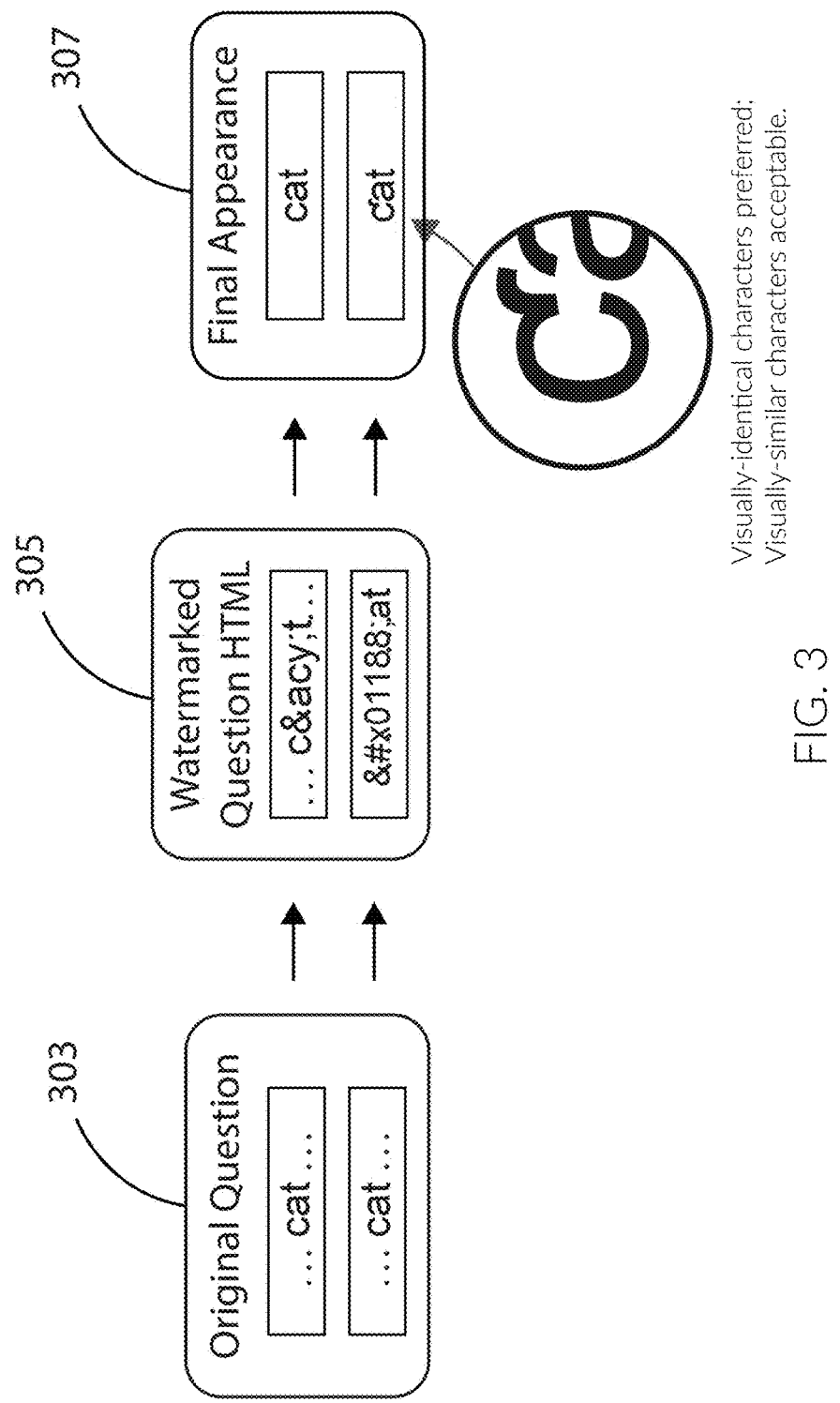
FIG. 3 is a detailed schematic of the watermarking process.

FIG. 3 is a detailed schematic of the watermarking process in accordance with an aspect of the disclosure. A pair of original questions 303 are converted into watermarked questions in Hyper Text Markup Language (HTML) at 305 by the watermarking engine. The watermarked questions retain their original appearance at 307. Note, the letters of the watermarked questions are preferably visually identical to the originals, but similar appearing letters are also acceptable substitutes.

Figure 4:
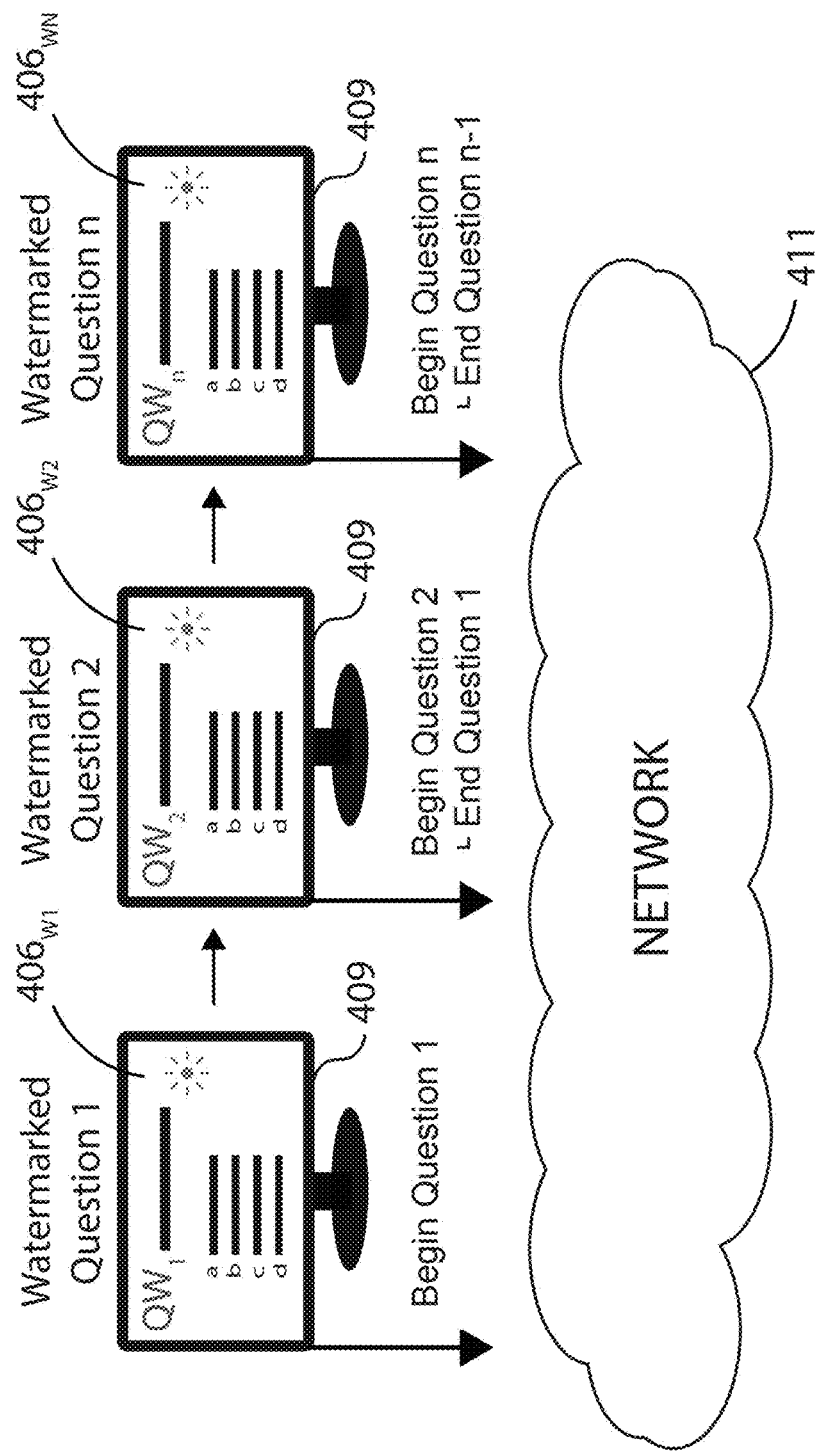
FIG. 4 depicts a sequential process for administering an assessment using watermarked questions.

FIG. 4 is a schematic of a sequential process for administering an assessment 400 using watermarked questions. The questions are presented on a network access device generally characterized by the reference numeral 409. The network access device is configured to communicate with a communications network shown generally at 411, and can be any type of general-purpose computer, tablet, smartphone, personal digital assistant, and the like.

Figure 5:
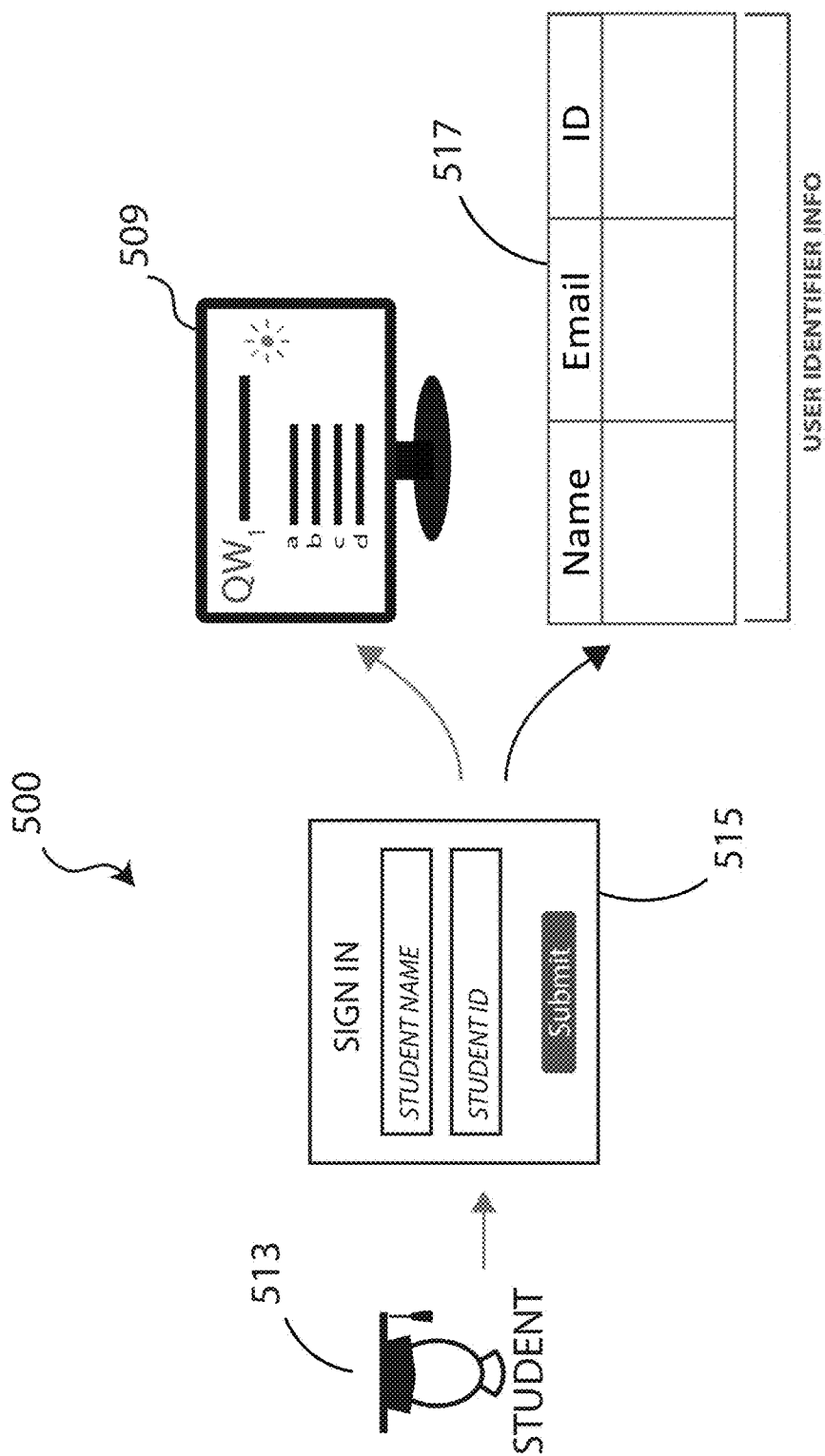
FIG. 5 illustrates details of an exemplary initial sign-on process within a learning management system.

FIG. 5 is a schematic diagram showing details of an initial sign-on process 500 within a learning management system (LMS) in accordance with an aspect of the disclosure. A student (assessment taker) 513 is presented with a sign-in/on portal on a network access device 509, which prompts for entry of the student's name and identification (ID), email, etc. The student completes and submits this information 517 prior to starting the assessment. This prevents assigning the user's identifier information to their PHP server header information. The user's identifying information is captured and assigned to their corresponding PHP server headers. The information is thereafter matched up with the assessment taker's PHP server headers.

Figure 6:
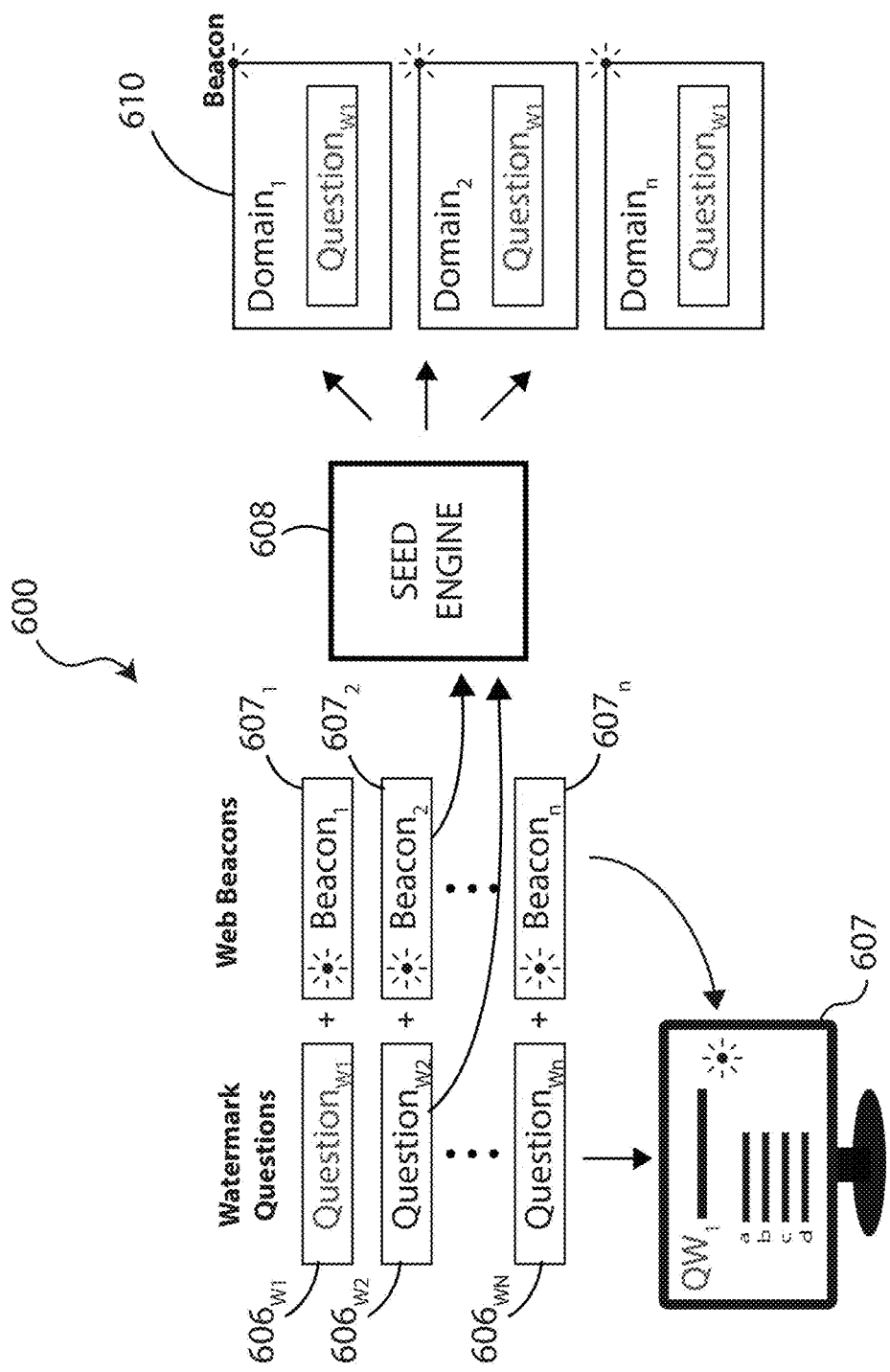
FIG. 6 depicts a watermarking process in greater detail in accordance with aspects of the disclosure.

FIG. 6 illustrates a more detailed view of a watermarking process 600 in accordance with the disclosure. Watermarked questions $606_{w1}$, $606_{w2}$, ... $606_{wn}$ are used for two purposes that occur simultaneously. First, the server 102 (FIG. 1) processes a pool of watermarked questions using the seed engine 108. The purpose of seed engine 108 is to propagate the watermarked questions onto various seed site domains 110. This creates a cluster of seed sites that can be monitored during an exam. Each seed site domain 110 contains a listener engine 112 that tracks listener events (to determine visit duration, mouse hover x/y coordinates, mouse click events and x/y coordinates, screen resolution, window resolution), in addition to any available PHP server header information when the seed site domain is loaded. Second, the watermarked questions are submitted to an LMS as a replacement for the original questions to be used for an assessment.

Figure 7:
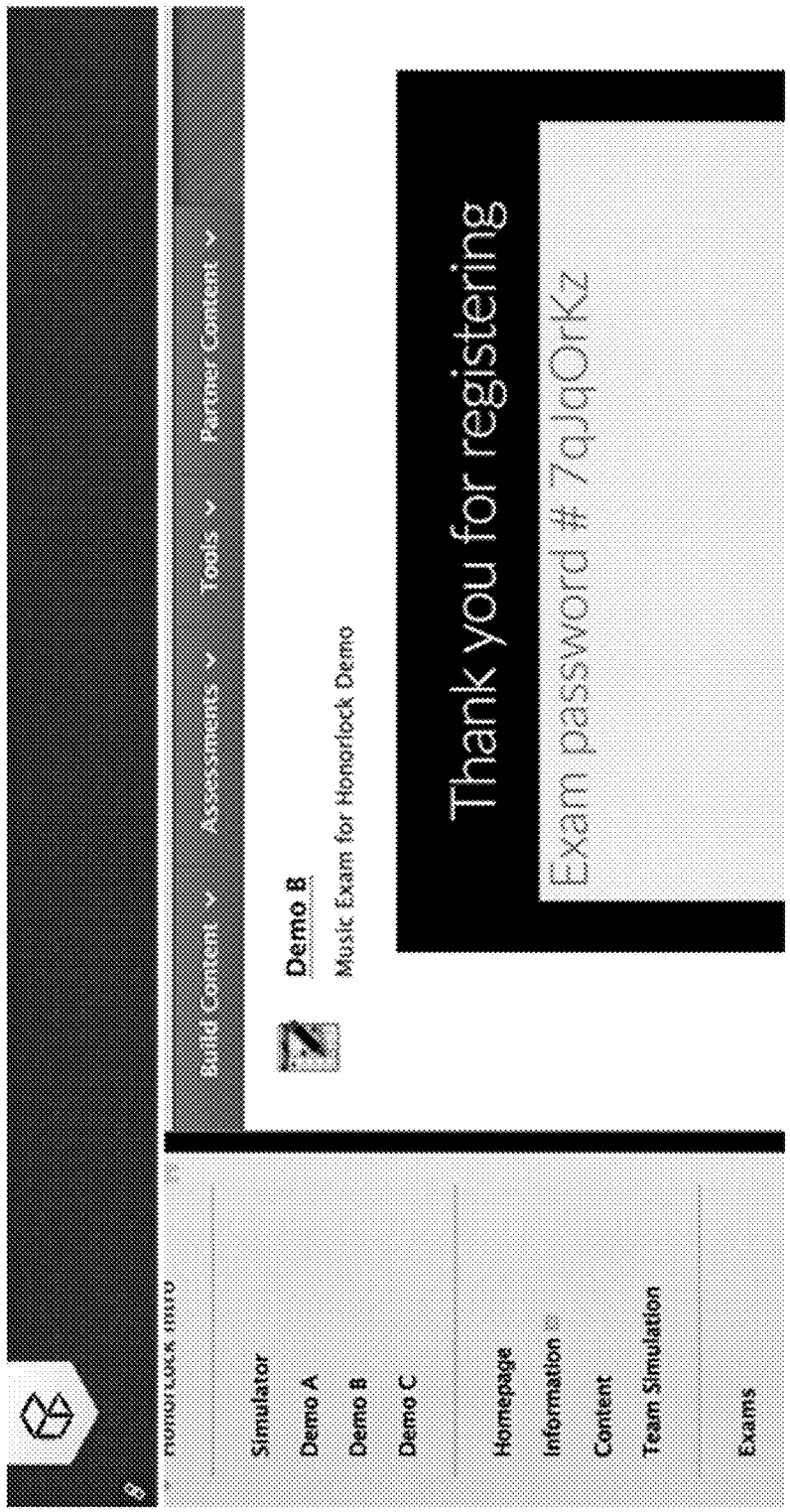
FIG. 7 is a screenshot of an illustrative graphical user interface (web page) utilized in a demo according to the present disclosure.

FIG. 7 is a screenshot of an illustrative graphical user interface via a web page utilized in a demonstration of the disclosure. Upon registering to take an assessment, a student is provided with an Exam Password as shown. If at any point during the assessment the student uses a search engine such as, for example, GOOGLE, to search for illicit online materials/test banks/answers, they are in violation of the terms of the assessment. When a user queries the search engine with watermarked terms, the search results present corresponding seed site domains 110, as described above.

Figure 8:
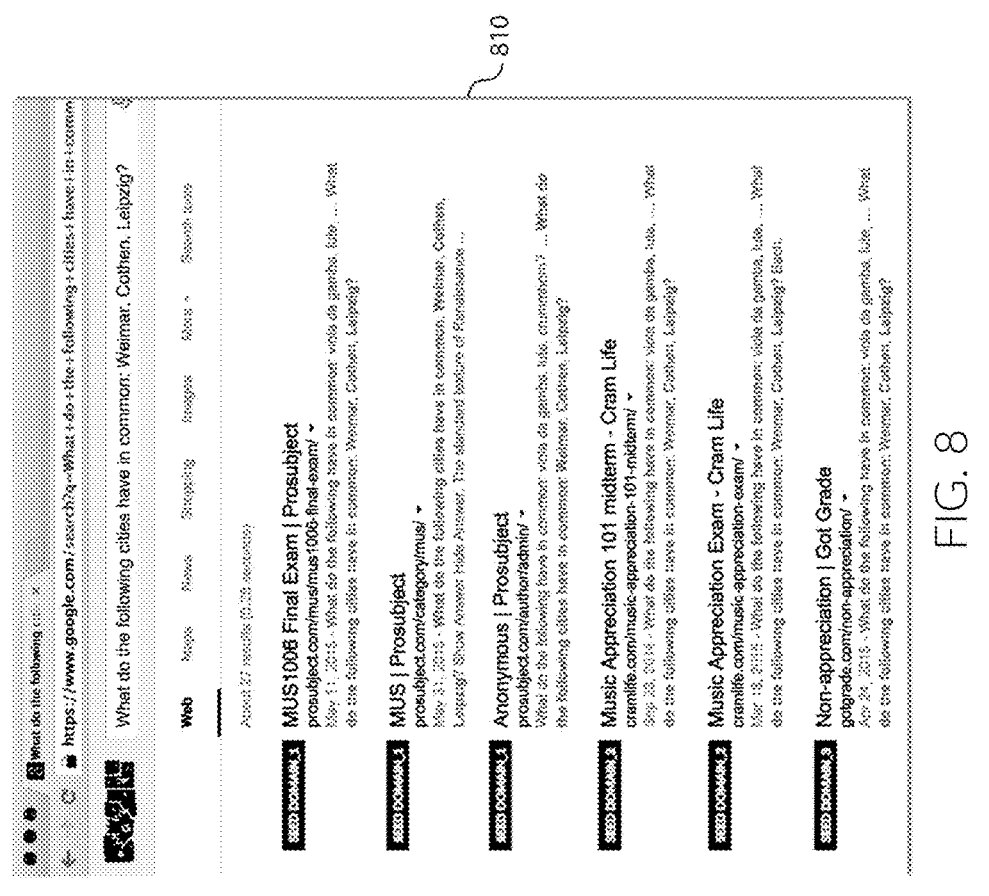

FIG. 8 is a screenshot of an exemplary web page 800 that presents seed sites after a search undertaken by a student using the watermarked questions.

Figure 9:
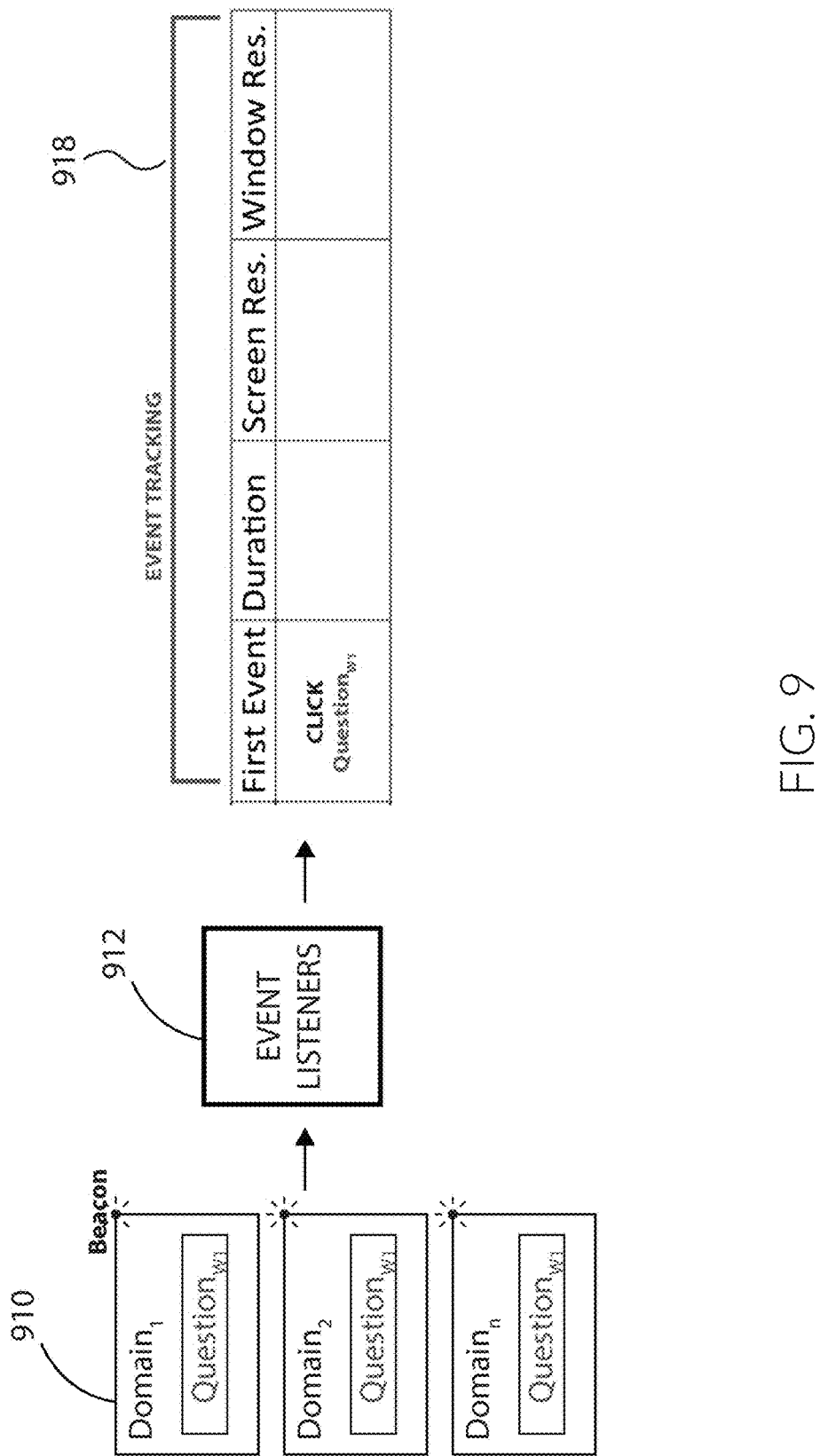
FIG. 9 is a flow diagram of the actions that occur when a test-taker visits a seed site(s)

With reference now to FIG. 9, when a test-taker visits a seed site link, the following operations will occur. Upon page load of the seed site domain 910/1010, the system server 102 (FIG. 1) will capture the PHP server headers courtesy of the web beacon on that page. In addition, seed site domains 910 are monitored by event listening engines 912, which track actions taken on the page, including any load, hover, click, etc. The first click action taken on a seed site domain 910 typically represents the specific question that the user is searching for. These events are tracked and sent to the system server 102 (FIG. 1), including first event type and location, duration, screen resolution, and window resolution 918.

This event tracking information will be used two ways: (a) for algorithm processing to determine if the user had been accessing the seed site domain (i.e., illicit exam content) while simultaneously taking the exam; and (b) to allow for a visual replay of the event, mimicking mouse tracking coordinates, clicks, and other events in the order and times that they occurred. This enables the client to render a visual representation of the violation. The actions of the test-taker can be subsequently rendered on any suitable graphical user interface of a computing device of the test administrator to provide evidence of such cheating during the examination.

In accordance with another embodiment, the original questions are fed to the seed engine 108 together with the watermarked questions so both versions of the questions are presented online during the examination. For example, out of a question pool of say 50 questions, a defined subset (e.g., 5%) are ranked at the top with no uniqueness. These questions are in competition with actual illicit test-bank providers. To address this problem, instructors can provide 3-5 original, unique, never-seen-before questions during the exam that can be fed to the seed engine 108 to ensure that at least a few questions have high SEO positioning in the event that a test-taker simply retypes (not copies/pastes) the question into a search engine. As the test-taker only needs to be detected to be in violation for a single occurrence to be identified as a "cheater," a small percentage of un-watermarked questions in the pools will be sufficient.

Figure 10:
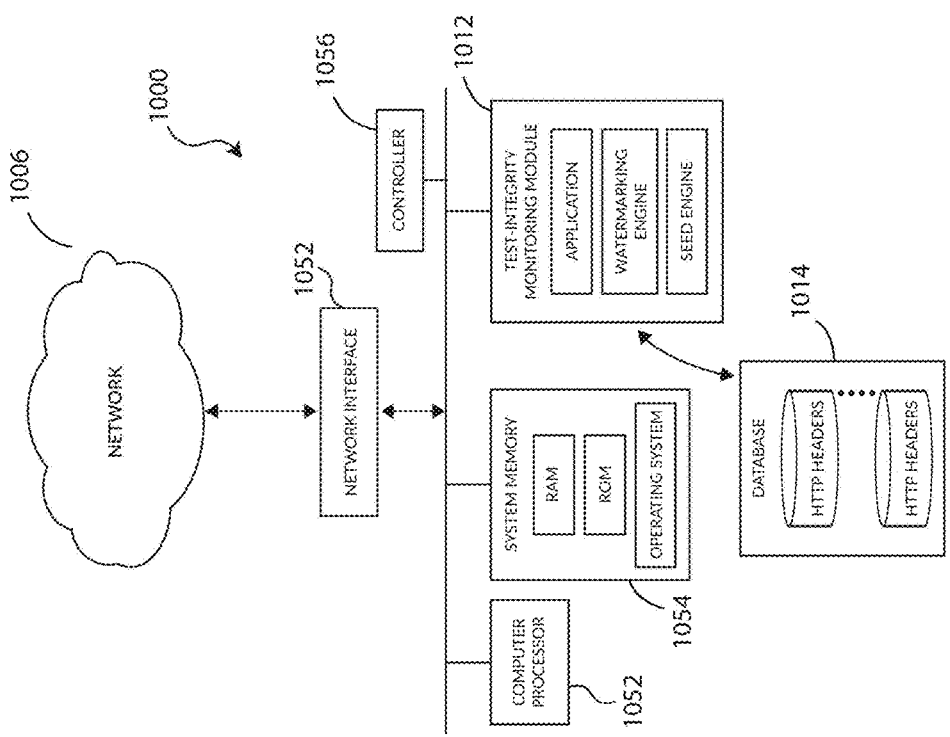
FIG. 10 is a schematic of an illustrative computerized system coupled to a communications network for carrying out aspects of the disclosure.

FIG. 10 is schematic diagram of an illustrative architecture 1000 of a computerized system for carrying out aspects of the disclosure. A network interface 1050 couples to a communications network 1006, and at least one computer processor 1052, system memory 1054 including random access memory (RAM), read only memory (ROM) and an operating system stored in persistent memory, an I/O controller 1056, database 1014 and at least one test-integrity monitoring module 1012. The computer processor 1052 may comprise one more microprocessors, co-processors, or the like, and is in communication with network interface 1050 to communicate data via network 1006. The network interface 1050 can include a plurality of communication channels for simultaneous communication with other processors, servers, etc. Module 1012 comprises program code that is executed by computer processor 1052 to implement the functionality of the watermarking engine, seed engine and listener engine as described above to detect cheating. The module 1012 may couple to database 1014 to store the seed site domains, PHP headers via the seed sites, and even tracking information.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The drawings and the description above relate to various embodiments by way of illustration only. It is noted that wherever practicable similar or like reference numbers may be used in the drawings and may indicate similar or like functionality. The drawings depict embodiments of the disclosed system (or method) for purposes of illustration only. One skilled in the art will readily recognize from the following description that alternative embodiments of the structures and methods illustrated and described herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system may be further divided into logical modules. One of ordinary skill in the art will recognize that a computer or another machine with instructions to implement the functionality of one or more logical modules is not a "general purpose" computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting cheating during online assessments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A server for identifying online usage of honeypots by test-takers during administration of online assessments, comprising:

at least one computer processor;

program instructions, which when executed by the at least one computer processor causes the computer processor to:

receive a pool of test questions used for learning assessment;

convert each question in the pool into a watermarked question comprising a unique string of characters;

create a corresponding web beacon for each watermarked question in the pool;

load available PHP server header information;

propagate each watermarked question onto at least one seed site domain to create a cluster of seed sites; and detect when a test-taker visits at least one of the seed sites during an online assessment.

2. The server recited in claim 1, further comprising a watermarking engine that creates unique strings that are accorded preference in search engines, the search engines being at least one of indexed search engines and crawled search engines.

3. The server recited in claim 1, wherein each watermarked question maintains a visual appearance of an original question.

4. The server recited in claim 1, wherein the web beacon is a transparent pixel.

5. The server recited in claim 1, wherein the web beacon enables identification of an assessment taker's credentials.

6. The server recited in claim 5, wherein the web beacon further enables detection of a web page load time for a question accessed during the online assessment.

7. The server recited in claim 1, wherein the web beacon comprises PHP header information including at least one of IP address, User Agent, URL, Timestamp, and Referrer.

8. The server recited in claim 7, wherein questions are presented consecutively and a range of time taken for an assessment taker with respect to a watermarked question is determined for each watermarked question.

9. The server recited in claim 8, wherein each seed site domain includes a listener engine for tracking listener events.

10. The server recited in claim 9, wherein the pool of watermarked questions are submitted to a learning management system as a replacement for original questions to be used for an assessment.

11. The server recited in claim 1, further comprising propagating an un-watermarked subset of the pool of questions in original format to the at least one of the seed sites.

12. A method for identifying online usage of honeypots by test-takers during administration of online assessments, comprising the steps of:

via at least one computer processor coupled to a network interface:

receiving a pool of test questions used for learning assessment;

converting each question in the pool into a watermarked question comprising a unique string of characters;

creating a corresponding web beacon for each watermarked question in the pool;

loading available PHP server header information;

propagating each watermarked question onto at least one seed site domain to create a cluster of seed sites; and detecting when a test-taker visits at least one of the seed sites during an online assessment.

13. The method recited in claim 12, further comprising a watermarking engine that creates unique strings that are accorded preference in search engines, the search engines being at least one of indexed search engines and crawled search engines.

14. The method recited in claim 12, wherein each watermarked question maintains a visual appearance of an original question.

15. The method recited in claim 12, wherein the web beacon is a transparent pixel.

16. The method recited in claim 12, wherein the web beacon enables identification of an assessment taker's credentials.

17. The method recited in claim 16, wherein the web beacon further enables detection of a web page load time for a question accessed during the online assessment.

18. The method recited in claim 12, wherein the web beacon comprises PHP header information including at least one of IP address, User Agent, URL, Timestamp, and Referrer.

19. The method recited in claim 18, wherein questions are presented consecutively and a range of time taken for an assessment taker with respect to a watermarked question is determined for each watermarked question.

20. The method recited in claim 19, wherein each seed site domain includes a listener engine for tracking listener events.

21. The method in claim 12, further comprising propagating an un-watermarked subset of the pool of questions in original format to the one of the seed sites.

22. A non-transitory computer readable medium comprising program instructions stored thereon, which when executed by at least one computer processor, cause a server to:

receive a pool of test questions used for learning assessment;

convert each question in the pool into a watermarked question comprising a unique string of characters;

create a corresponding web beacon for each watermarked question in the pool;

load available PHP server header information;

propagate each watermarked question onto at least one seed site domain to create a cluster of seed sites; and detect when an assessment taker visits at least one of the seed sites during an online assessment.

\* \* \* \* \*